United States Patent
Parmeter et al.

(10) Patent No.: US 11,499,403 B2
(45) Date of Patent: Nov. 15, 2022

(54) ELASTOMERIC SEAL BAG PROTECTOR

(71) Applicant: Halliburton Energy Services, Inc., Houston, TX (US)

(72) Inventors: Larry James Parmeter, Broken Arrow, OK (US); Jeffrey G. Frey, Broken Arrow, OK (US)

(73) Assignee: Halliburton Energy Services, Inc., Houston, TX (US)

(*) Notice: Subject to any disclaimer, the term of this patent is extended or adjusted under 35 U.S.C. 154(b) by 391 days.

(21) Appl. No.: 16/626,794

(22) PCT Filed: Jun. 22, 2018

(86) PCT No.: PCT/US2018/039050
§ 371 (c)(1),
(2) Date: Dec. 26, 2019

(87) PCT Pub. No.: WO2019/022880
PCT Pub. Date: Jan. 31, 2019

(65) Prior Publication Data
US 2020/0116000 A1    Apr. 16, 2020

Related U.S. Application Data

(60) Provisional application No. 62/536,534, filed on Jul. 25, 2017.

(51) Int. Cl.
*E21B 43/12* (2006.01)
*F04D 13/08* (2006.01)
(Continued)

(52) U.S. Cl.
CPC .......... *E21B 43/128* (2013.01); *F04D 13/086* (2013.01); *F04D 13/10* (2013.01);
(Continued)

(58) Field of Classification Search
CPC .... E21B 43/128; F04D 13/086; F04D 29/086; F04D 29/426; F04D 13/10; H02K 5/10; H02K 5/132
See application file for complete search history.

(56) References Cited

U.S. PATENT DOCUMENTS 6,046,521 A * 4/2000 Heinig ................... H02K 5/132
                                                             310/87
8,246,052 B1 * 8/2012 Marvel, III ........... F16L 55/134
                                                              92/205
(Continued)

FOREIGN PATENT DOCUMENTS

CA      2738354 A1 * 10/2011 ......... E21B 33/1277
WO   2010051197 A2       5/2010

OTHER PUBLICATIONS

PCT Application Serial No. PCT/US2018/039050, International Search Report, dated Oct. 15, 2018, 4 pages.
(Continued)

*Primary Examiner* — Dominick L Plakkoottam
(74) *Attorney, Agent, or Firm* — DeLizio, Peacock, Lewin & Guerra

(57) ABSTRACT

A downhole tool includes an electric submersible pump to pump a well fluid to a surface of a borehole. The downhole tool includes a motor to power the electric submersible pump and a seal section to protect the motor from the well fluid. The seal section includes an elastomeric bag and a clamp at each end of the elastomeric bag to secure the elastomeric bag. The seal section includes an elastomeric bag protector secured around each clamp, wherein the elastomeric bag protector extends axially beyond a respective clamp to surround a tapered portion of the elastomeric bag above and below the clamp, and wherein the elastomeric
(Continued)

bag protector has a sloped inner diameter that matches a profile of the tapered portion.

19 Claims, 9 Drawing Sheets

(51) Int. Cl.
    *F04D 29/08*   (2006.01)
    *F04D 29/42*   (2006.01)
    *H02K 5/10*    (2006.01)
    *H02K 5/132*   (2006.01)
    *F04D 13/10*   (2006.01)
    *F04D 1/06*    (2006.01)
    *F04D 7/06*    (2006.01)

(52) U.S. Cl.
    CPC ......... *F04D 29/086* (2013.01); *F04D 29/426* (2013.01); *H02K 5/10* (2013.01); *H02K 5/132* (2013.01); *F04D 1/06* (2013.01); *F04D 7/06* (2013.01)

(56) References Cited

U.S. PATENT DOCUMENTS

| | | |
|---|---|---|
| 8,419,387 B1 | 4/2013 | Karbs et al. |
| 2002/0192090 A1 | 12/2002 | Du et al. |
| 2010/0111711 A1 | 5/2010 | Chilcoat et al. |
| 2011/0194956 A1* | 8/2011 | Royzen ................. E21B 43/128 |
| | | 417/423.3 |
| 2014/0014373 A1* | 1/2014 | Richards ............. E21B 17/1035 |
| | | 166/242.6 |
| 2014/0202681 A1* | 7/2014 | Merrill ................... F04D 13/10 |
| | | 166/105 |
| 2017/0030171 A1 | 2/2017 | Collins |
| 2019/0040711 A1* | 2/2019 | McManus ............. E21B 43/128 |

OTHER PUBLICATIONS

PCT Application Serial No. PCT/US2018/039050, Written Opinion dated Oct. 15, 2018, 11 pages.

CA Application No. 3063541, Office Action dated Jun. 7, 2021, 5 pages.

* cited by examiner

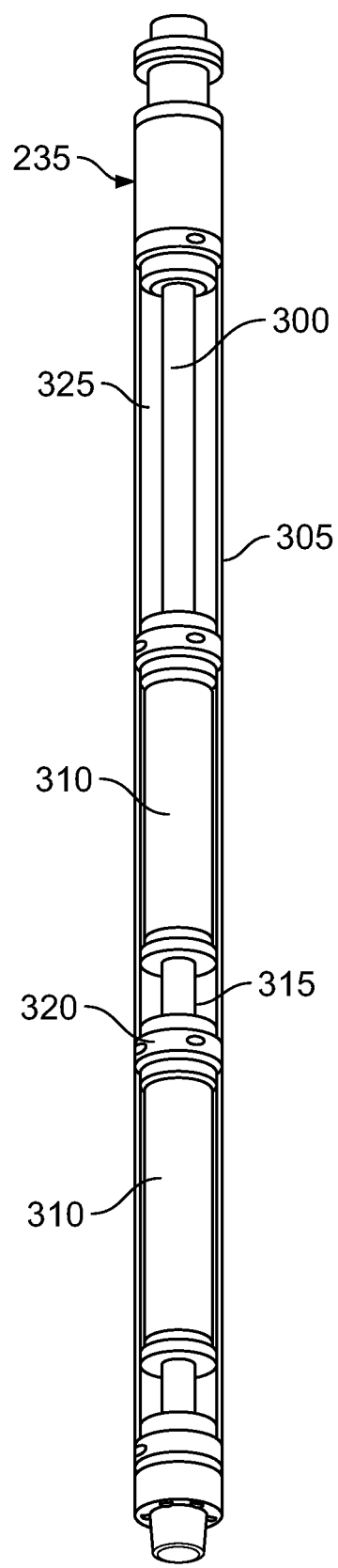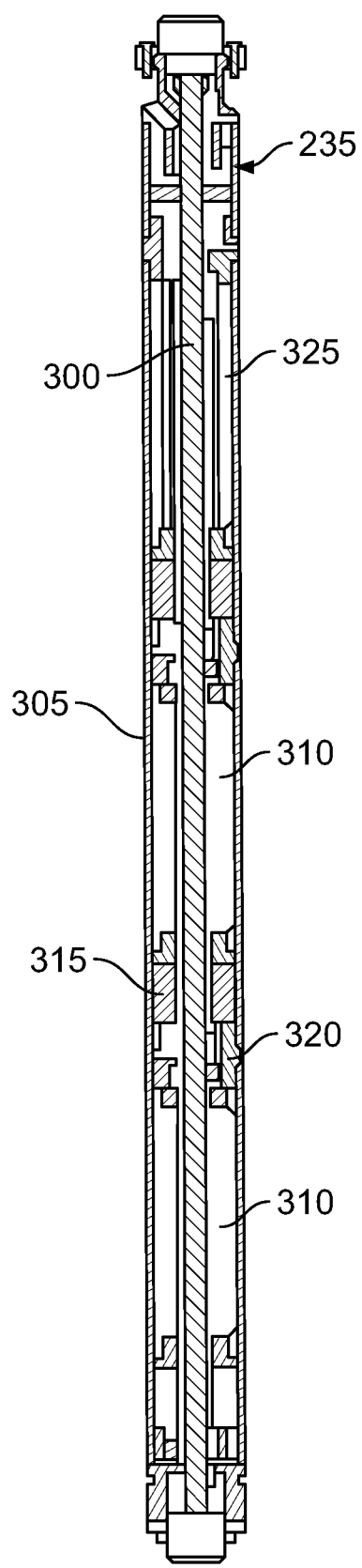
FIG. 3A   FIG. 3B

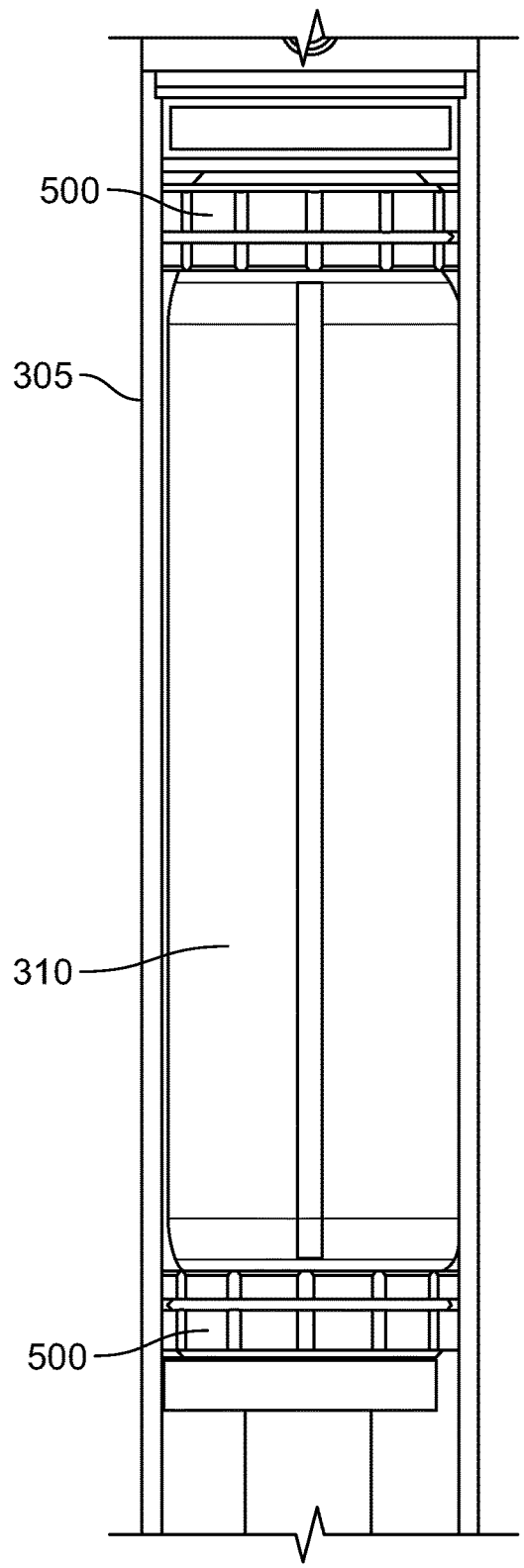
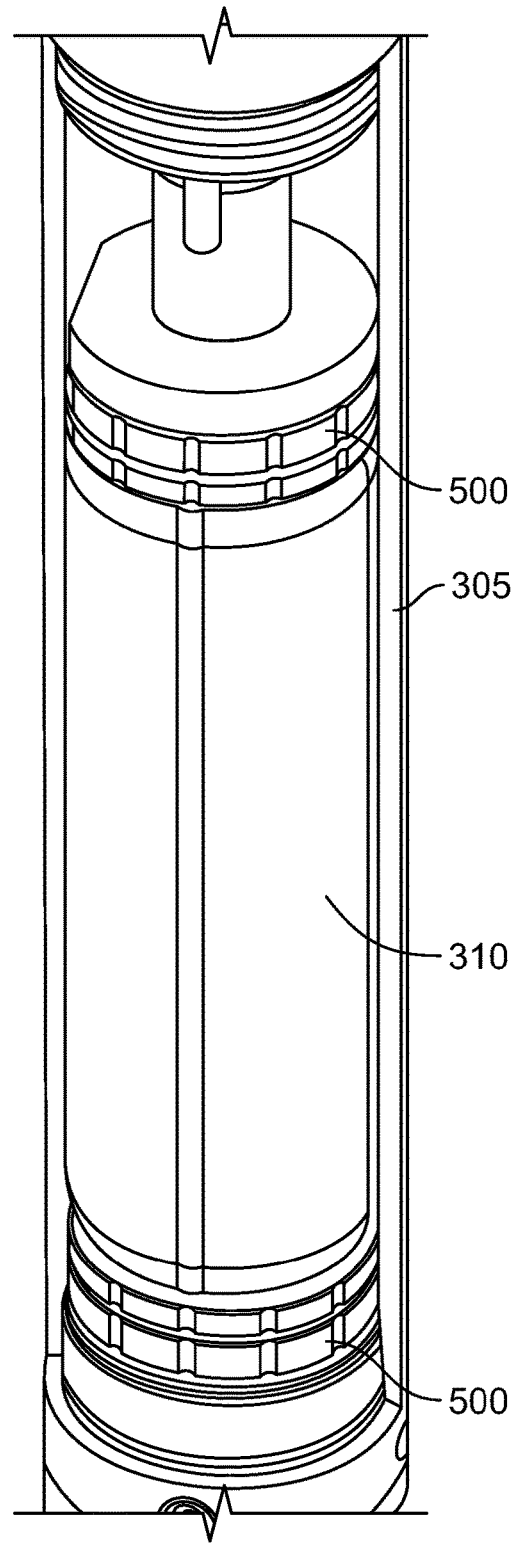
FIG. 5A
FIG. 5B

ELASTOMERIC SEAL BAG PROTECTOR

BACKGROUND

The disclosure generally relates to the field of elastomeric bag seal sections for electric submersible pumps, and more particularly, to an elastomeric seal bag protector.

Fluid, such as natural gas, oil or water, is often located in underground formations. In such situations, the fluid is often pumped to the surface so that it can be collected, separated, refined, distributed and/or sold. Centrifugal pumps are typically used in electric submersible pump (ESP) applications for lifting well fluid to the surface. Centrifugal pumps accelerate a working fluid through a rotating impeller, which is driven by a rotating shaft. The shaft's rotation is powered by an electrical motor located on the upstream side of the pump assembly, typically a two-pole, three-phase squirrel cage induction motor.

Conventional ESP assemblies employ seal sections between the electric motor and the multi-stage centrifugal pump. Seal sections, also sometimes called motor protectors, protect the motor from well fluid ingress by providing a barrier between the well fluid and motor oil. Additionally, the seal section provides pressure equalization to counteract expansion of the motor oil and carries the thrust of the pump. Conventional seal sections make use of elastomeric bags or diaphragms, which expand and contract in response to temperature or pressure changes. Conventionally, the elastomeric bags are attached within the seal section using clamps on each end of the elastomeric bag.

ESPs are often employed in high temperature environments, in some cases operating in wells reaching temperatures of 350-400° F. The elastomeric bags of the ESP's seal section rapidly lose mechanical strength at elevated temperatures, particularly above about 300-350° F. As a result of the weakened or fatigued material and the contained pressure, the elastomeric bags expand and protrude over the clamps that secure the elastomeric bags in place within the seal section. As shown in FIG. 1, sections 115 of conventional elastomeric bag 100 near clamp 110 expand into the sharp edges of conventional clamp 110, puncturing the elastomeric bag. Once pierced, an elastomeric bag cannot function to equalize pressure or seal the motor from well fluid, which leads to failure of the electric motor. Motor failure can be catastrophic for ESP operation, as it requires the removal of the ESP assembly for repair and, in some cases, replacement.

To date, attempts have been made to roll the sharp edges of the clamp in order to reduce the sharpness that risks cutting the elastomeric bag. However, such attempts have not been successful in dulling the clamp sufficiently to prevent puncture of the bag when in a weakened, expanded state.

As is apparent from the above, currently available elastomeric bags for ESP seal sections are susceptible to puncturing from contact with the sharp edges of the clamps that hold them in place. Therefore, there is a need for an elastomeric seal bag protector to protect elastomeric bags from the sharp edges of clamps.

BRIEF DESCRIPTION OF THE DRAWINGS

Embodiments of the disclosure may be better understood by referencing the accompanying drawings.

FIG. 3A is a perspective view of an ESP seal section of an illustrative embodiment.

FIG. 3B is a cross-sectional view of an ESP seal section of an illustrative embodiment.

FIG. 5A is a side elevation view of an exemplary elastomeric bag seal section having an elastomeric seal bag protector of an illustrative embodiment.

FIG. 5B is a perspective view of an exemplary elastomeric bag seal section having an elastomeric seal bag protector of an illustrative embodiment.

DESCRIPTION

The description that follows includes example systems, methods, techniques, and program flows that embody embodiments of the disclosure. However, it is understood that this disclosure can be practiced without these specific details. For instance, while described as part of a downhole tool positioned in a borehole for pumping fluids to the surface, some embodiments can be incorporated into other devices or applications in which a bag is secured, using clamps, around components for protection. In other instances, well-known instruction instances, protocols, structures and techniques have not been shown in detail in order not to obfuscate the description.

Illustrative embodiments may prevent elastomeric bag damage and/or equipment failure as a result of elastomeric bag expansion that causes the bag to protrude over sharp-edged clamps in high temperature applications. Illustrative embodiments may decrease the likelihood of the clamp piercing the elastomeric bag and the resulting damage and/or equipment failure. Illustrative embodiments may provide an elastomeric bag seal section capable of operating in elevated temperatures of up to 350-4000 F and thus capable of protecting the electric submersible pump motor through a larger temperature range. Illustrative embodiments may be easily installed inside existing seal sections, which may allow low installation and/or capital costs.

Illustrative embodiments may include an elastomeric bag protector that secures around a clamp of an elastomeric seal. The protector may cover the sharp edges of the clamp and therefore may prevent the clamp from piercing the elastomeric bag even if the elastomeric bag expands over the clamp. An inner diameter of the elastomeric bag protector may be sloped to match the profile of the elastomeric bag that sits beneath the elastomeric bag protector. The sloped inner diameter of the protector may reduce protrusion of the elastomeric bag towards the clamp during elastomeric bag expansion. The protector of illustrative embodiments may include a cutout for the crimp of the clamp and the protector may be secured with an elastomeric ring around the waist of the protector. Axial channels spaced at intervals around the outer diameter of the protector may allow well fluid to flow between the protector and the housing of the seal section, despite the larger outer diameter of the clamp plus protector system.

Figure 1:
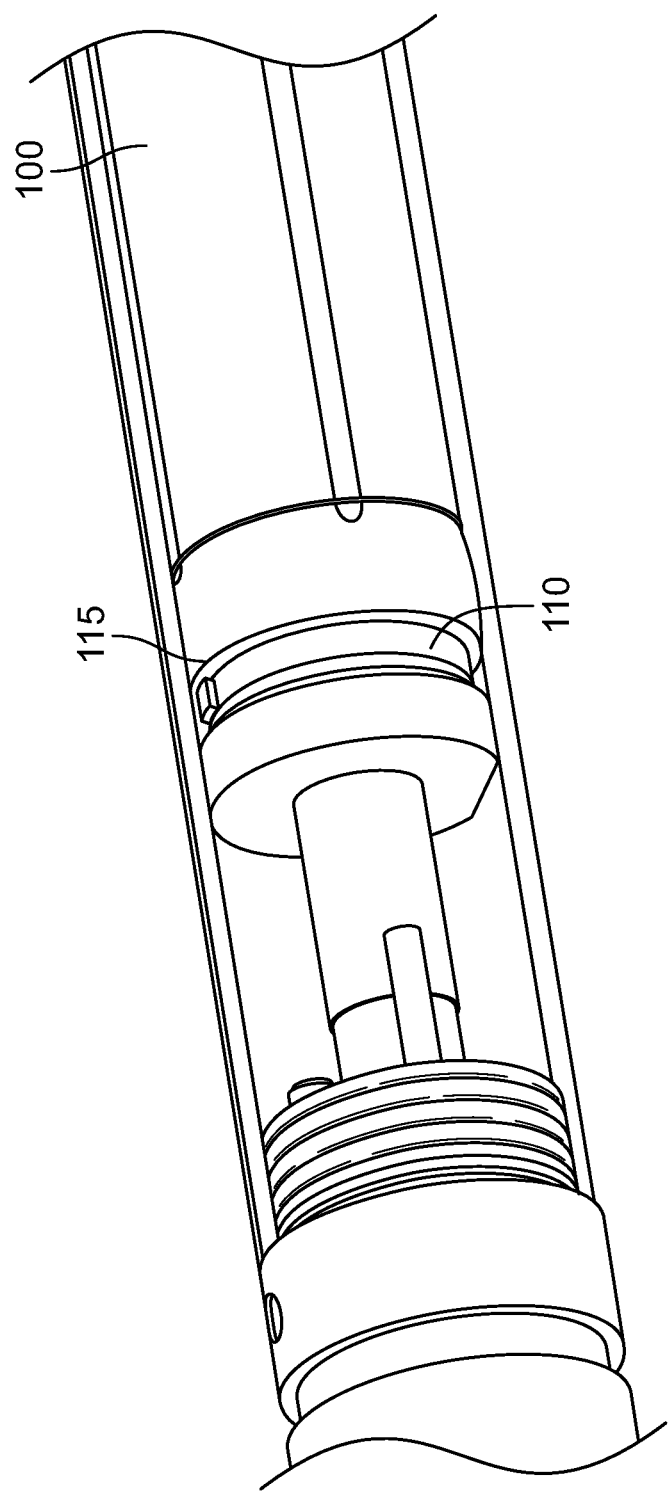
FIG. 1 is a perspective view of a conventional clamp around an elastomeric bag of the prior art.
Figure 2:
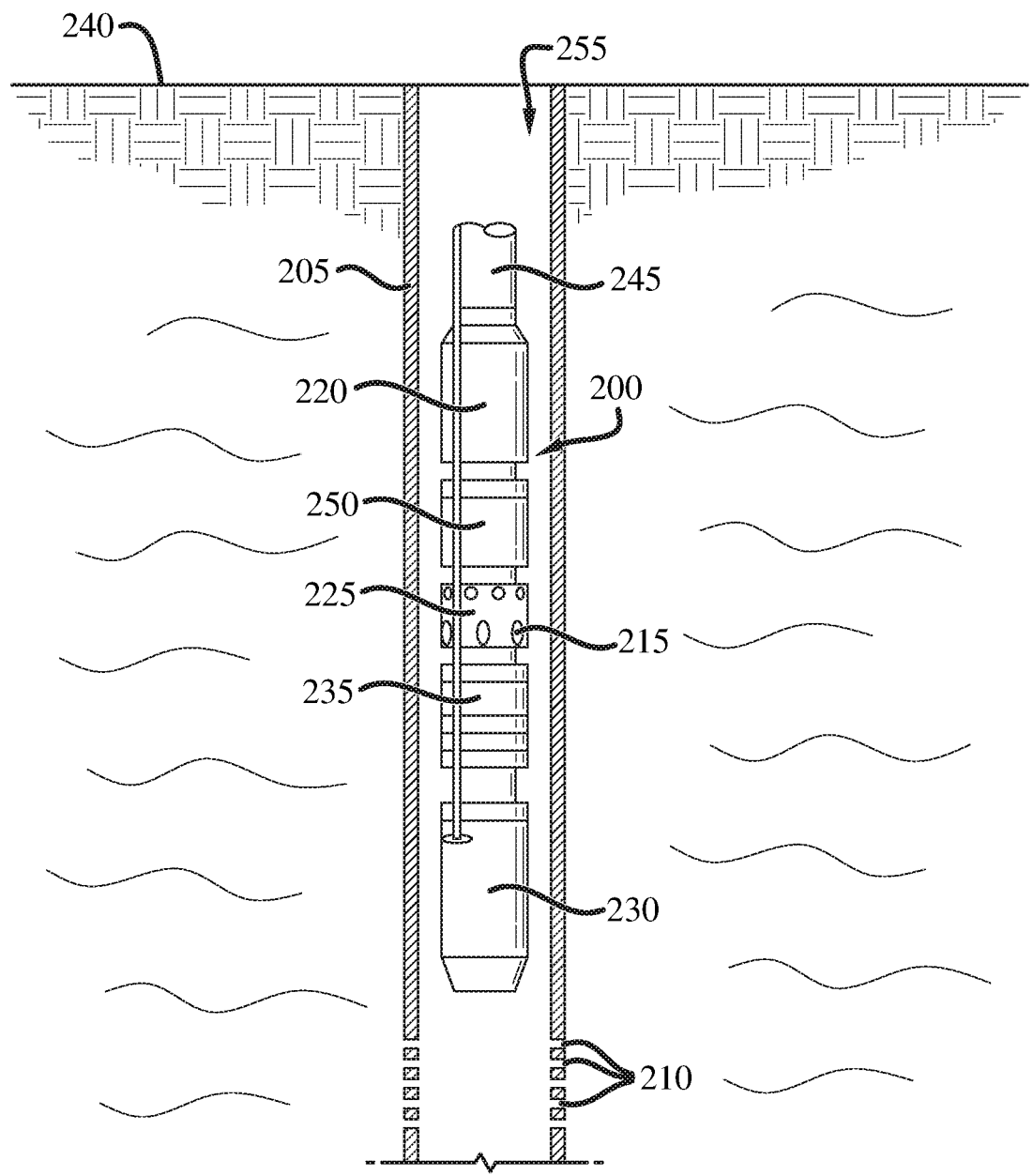
FIG. 2 is a perspective view of an electric submersible pump (ESP) assembly of an illustrative embodiment.

Illustrative embodiments may include an artificial lift assembly, such as an ESP assembly, which may be located downhole below the surface of the ground. FIG. 2 shows an exemplary ESP assembly 200. ESP assembly 200 may be positioned within well casing 205, which may separate ESP assembly 200 from an underground formation. Casing 205 may include perforations 210 for entry of well fluid into ESP pump 220. Well fluid may enter casing 205 through perforations 210 before traveling through casing annulus 255 towards intake ports 215, which intake ports 215 allow well fluid to enter assembly 200. Motor 230 may turn ESP pump 220 and may, for example, be a two-pole, three-phase squirrel cage induction motor. Seal section 235 may be a motor protector that employs one or more elastomeric bags that serve to equalize pressure and keep motor oil separate from well fluid. Gas separator 225 may be employed in gassy wells and separate gas prior to the gas' entry into ESP pump 220. ESP Pump 220 may be a multi-stage centrifugal pump and may lift fluid to surface 240. Production tubing 245 carries produced fluid to a wellhead on surface 240, and then into a pipeline, storage tank, transportation vehicle and/or other storage, distribution or transportation means. In some gassy applications, charge pump 250 may be included in ESP assembly 200, for example between gas separator 225 and centrifugal pump 220.

FIGS. 3A-3B illustrate a seal section 235 of illustrative embodiments. As shown in FIGS. 3A-3B, shaft 300 may extend centrally and longitudinally through seal section 235. Seal section housing 305 may enclose seal section 235. Seal section 235 may include one or more elastomeric bags 310, which elastomeric bags 310 serve to partition motor oil on the inside of elastomeric bag 310 from well fluid between elastomeric bag 310 and housing 305. Guide tubes 315 may support elastomeric bag 310 assembly and protect elastomeric bag 310 from rubbing on shaft 300. In some embodiments, labyrinth chamber 325 may be included inside seal section 235 and may provide a tortuous flow path for fluid, which may prevent fluid leakage.

Figure 4:
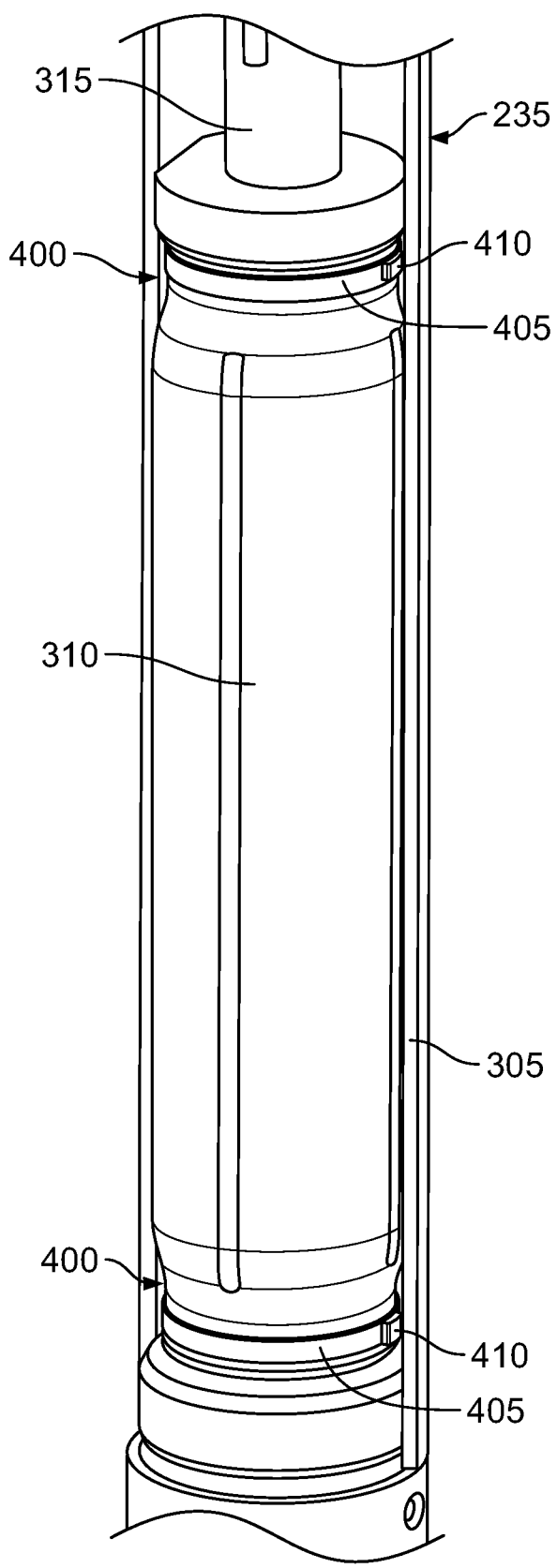
FIG. 4 is a perspective view of an elastomeric bag with clamps prior to placement of an elastomeric seal bag protector of an illustrative embodiment.

FIG. 4 illustrates elastomeric bag 310 inside a seal section 235 of illustrative embodiments, prior to installation of bag protector 500. As shown in FIGS. 3A-3B and 4, elastomeric bag 310 may be secured around shaft 300 inside housing 305. Elastomeric bag 310 may be composed of rubber, an elastomer, or a material having similar physical properties, as is known in the art. Elastomeric bag 310 may be shaped like a pipe, tube, or cylinder with inwardly-sloping ends. As shown in FIG. 4, each axial end of elastomeric bag 310 may have a tapered end 400 that slopes inward as elastomeric bag 310 extends toward the corresponding clamp 405. Elastomeric bag 310 may be sealed and/or secured at either end by clamp 405, which clamp 405 may compress end sections of elastomeric bag 310 around one or more adapters 320 that may support guide tube 315 and elastomeric bag 310 assembly. Clamp 405 may be band-shaped with a protruding crimp 410. Crimp 410 may extend radially outward from clamp 405. Crimp 410 may include two protruding "ears" that allow installation and/or removal of clamp 405.

Figure 5C:
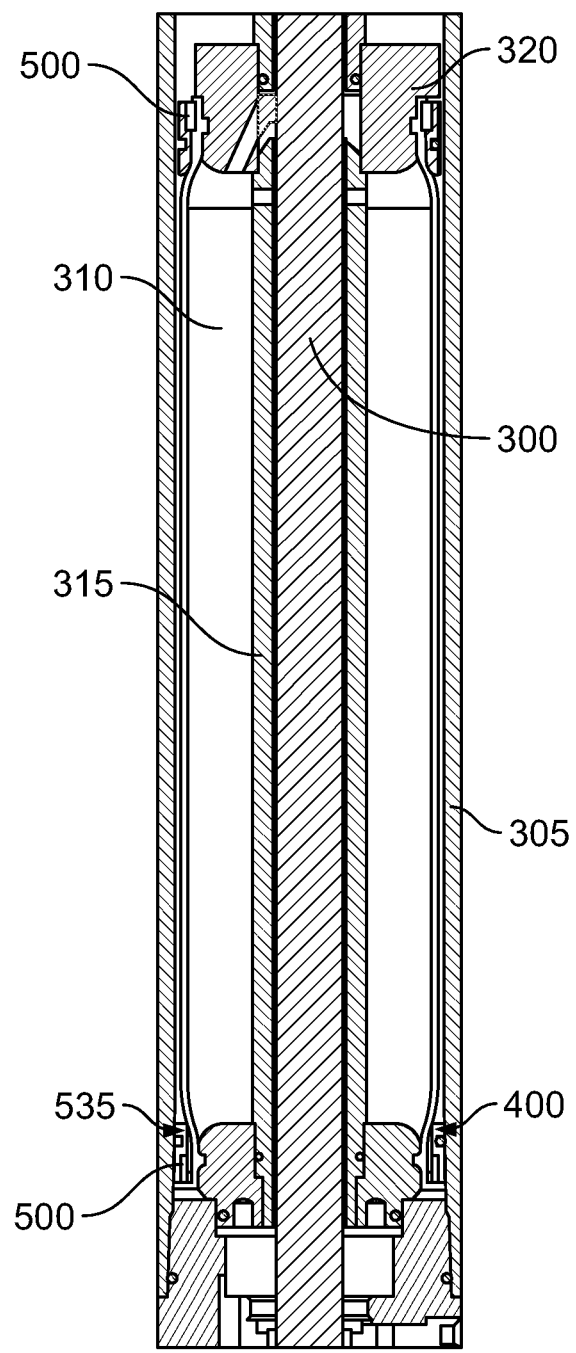
FIG. 5C is a cross-sectional view of an exemplary elastomeric bag seal section having an elastomeric seal bag protector of an illustrative embodiment.

An elastomeric seal bag protector of illustrative embodiments may cover and/or surround sharp edges of clamp 405 and protect elastomeric bag 310 from those sharp edges. FIGS. 5A-5C illustrate an elastomeric bag protector of an illustrative embodiment surrounding clamp 405. Elastomeric seal bag protector 500 may circumferentially enclose and/or secure around clamp 405 and may cover the edges of clamp 405 that may be pointed or sharp and/or the entire outer surface of clamp 405. Elastomeric bag protector 500 may extend axially further than clamp 405 on each top and bottom side, such that elastomeric bag protector 500 surrounds those sections of elastomeric bag 310 proximately above and below clamp 405, such as tapered end 400 of elastomeric bag 310. One or more elastomeric bag protectors 500 may be employed over each clamp 405 and/or over other sharp edges that may threaten to pierce elastomeric bag 310. Elastomeric bag protector 500 may extend tubularly between housing 305 and clamp 405. Bag protector 500 may fit snugly inside housing 305 or may be separated from the inside of housing 305 by a slight clearance.

Turning to FIG. 5C, protector 500 may include a sloped portion on its inner diameter, the sloped portion mirroring the slope of tapered end 400 as elastomeric bag 310 approaches clamp 405. Sloped portion 535 may extend on the side of elastomeric bag protector 500'sinner diameter that faces the body of elastomeric bag 310. Sloped portion 535 may slope inward as sloped portion 535 extends axially toward clamp 405, following the sloped shape of tapered end 400. The inner diameter of sloped portion 535 may decrease as it extends away from the main body of elastomeric bag 310. When bag protector 500 is installed, sloped portion 535 may surround tapered end 400.

Figure 6A:
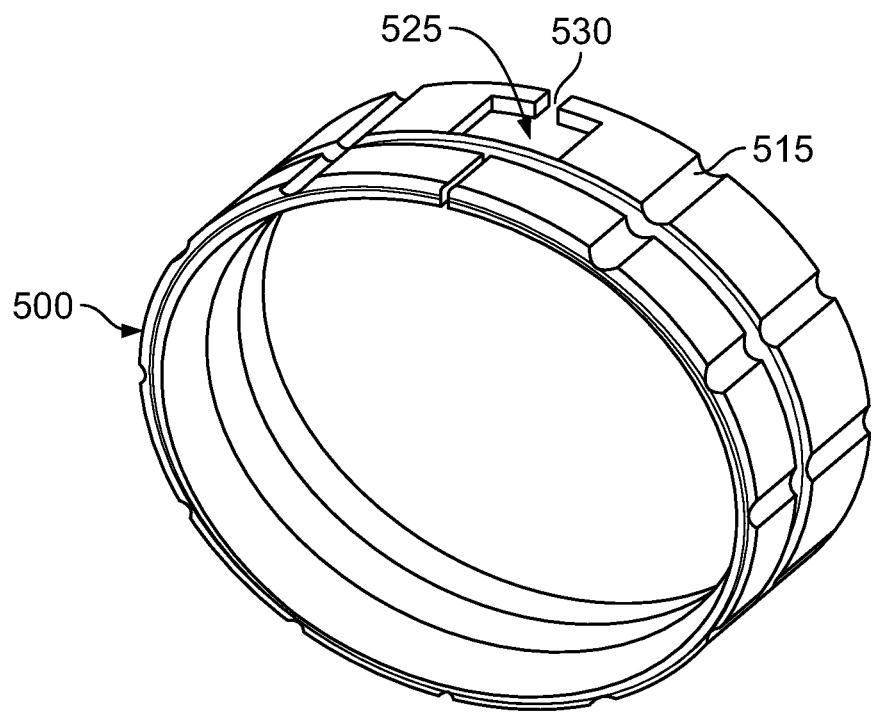
FIGS. 6A-6B are perspective views of an elastomeric seal bag protector of an illustrative embodiment.
Figure 6B:
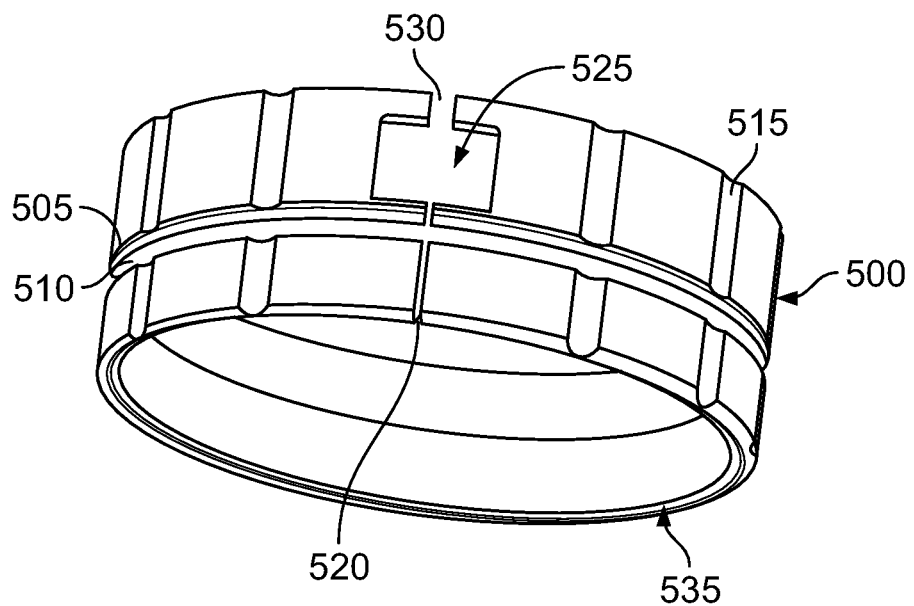

An exemplary elastomeric bag protector 500 is illustrated in FIGS. 6A-6B. As shown in FIGS. 6A and 6B, bag protector 500 may be band-like and/or shaped like a tube or hollow cylinder. Bag protector 500 may fit tightly around clamp and extend axially over the entire outer surface of clamp 405 as well as the tapered end 400 of elastomeric bag 310. Referring to FIG. 6B, bag protector 500 may extend circumferentially about 360°, with only a slight interstice 520 to allow bag protector 500 to open circumferentially for installation and/or removal of elastomeric bag protector 500. Bag protector 500 may include circumferential ring groove 505, which ring groove 505 may extend circumferentially around bag protector 500. Ring groove 505 may be about halfway to a third of the way up bag protector 500, when measured axially from the end of protector 500 having sloped inner diameter 535. Elastomeric ring 510, such as an O-ring, may be seated into ring groove 505 and may secure protector 500 around clamp 405 and/or ensure protector 500 remains closed around clamp 405. Elastomeric ring 510 may be placed into ring groove 505 prior to installation of protector 500 and may stretch and retract with protector 500 as protector 500 is installed around clamp 405. Elastomeric bag protector 500 may be made of an organic thermoplastic polymeric material such as polyether ether ketone (PEEK), polytetrafluoroethylene (PTFE), or another material having similar physical properties. Bag protector 500 may be fabricated by molding, for example compression molding, injection molding, or a similar process.

Bag protector 500 may include a plurality of channels 515 extending axially along the length of the outer diameter of bag protector 500 and spaced around bag protector 500's outer diameter. Channels 515 may have a semicircular profile with a rounded bottom and flat top. Each channel 515 may extend longitudinally along the outer diameter of bag protector 500 and may entirely traverse the surface. When bag protector 500 is installed inside housing 305, the plurality of channel 515 may form axially-directed flow passages around protector 500, through which well fluid may flow during operation. Eleven channels 515 are spaced at intervals around bag protector 500 in FIGS. 6A-6B, however, more or less than eleven channels 515 may be employed such as seven, nine or fifteen. As shown in FIGS. 6A-6B, bag protector 500 may include cutout 525, which cutout 525 may extend between ring groove 505 and slit 530. Cutout 525 may be square, rectangular, or similarly shaped opening and may mate with crimp 410 of clamp 405, such that crimp 410 extends through cutout 525 unimpeded by protector 500.

Figure 7A:
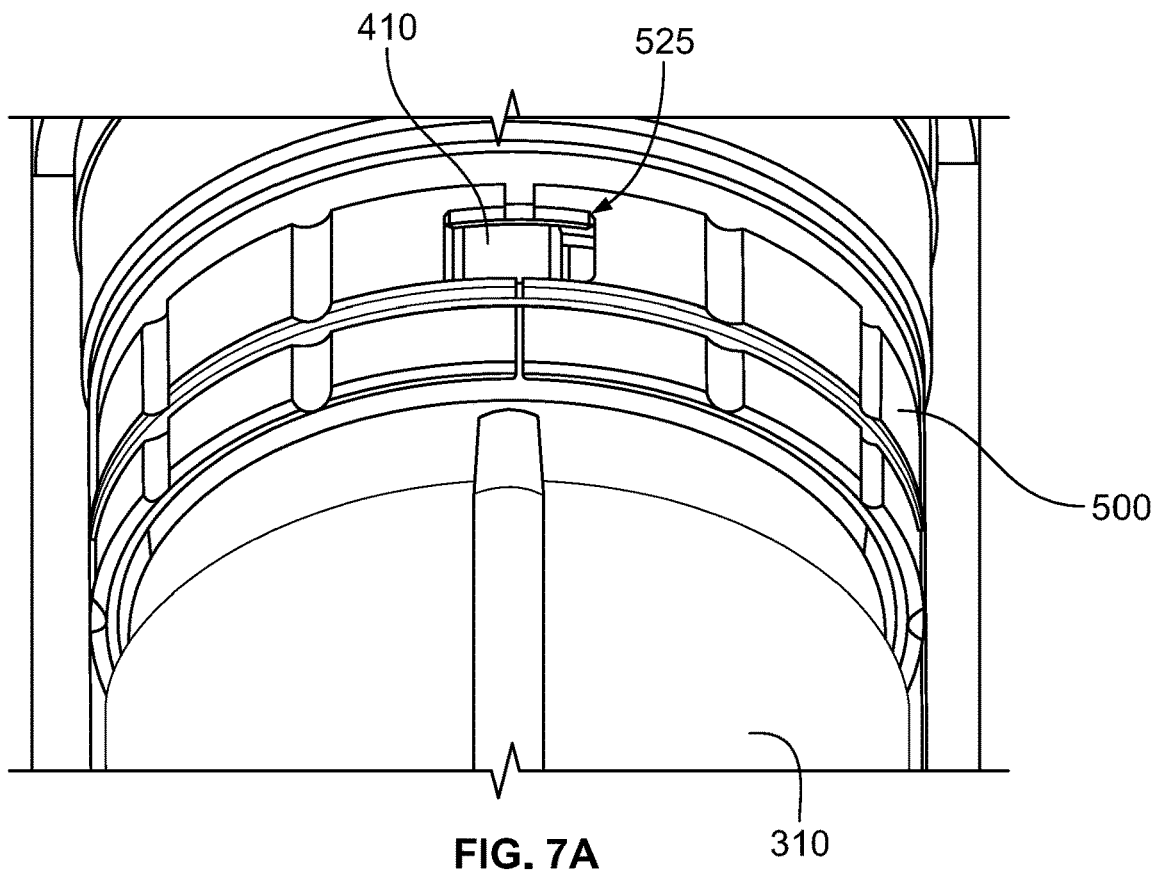
FIG. 7A is a perspective view of an elastomeric seal bag protector of an illustrative embodiment installed around a clamp.
Figure 7B:
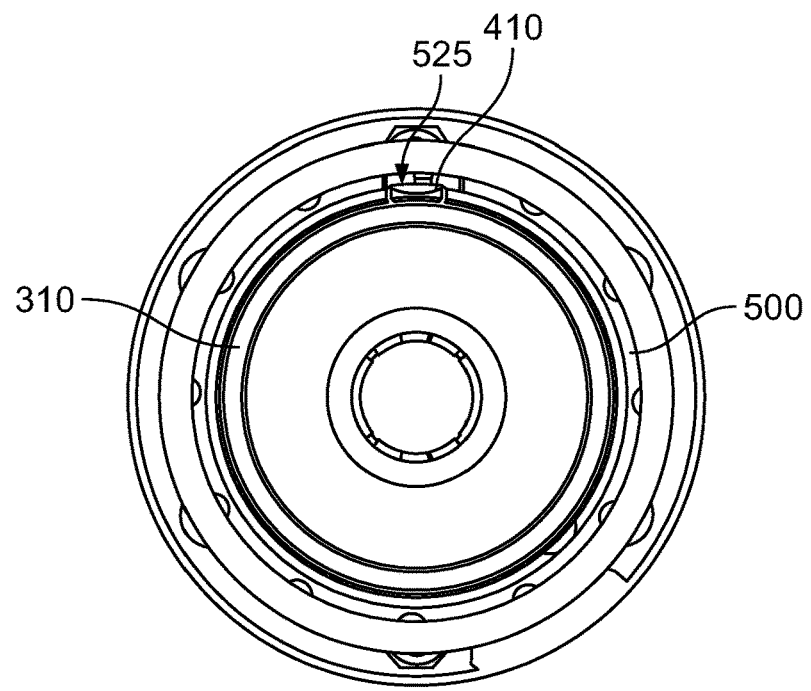
FIG. 7B is a cross-sectional view of an elastomeric seal bag protector of an illustrative embodiment secured around a clamp.

FIGS. 7A-7B illustrate a bag protector 500 of illustrative embodiments covering clamp 405 to protect elastomeric bag 310. As shown in FIGS. 7A-7B, cutout 525 mates with crimp 410 of clamp 405 when bag protector 500 is installed to extend around each clamp 405. Crimp 410 may extend radially outward so as to occupy the space defined by cutout 525, while the annular body of bag protector 500 encloses the band-shaped body of clamp 405. As shown in FIG. 7A, crimp 410 may be smaller than cutout 525 so as to sit inside cutout 525 with a space between crimp 410 and cutout 525. In other embodiments, clamp crimp 410 may completely or substantially occupy the space defined by cutout 525. In this way, cutout 525 mated with clamp crimp 410 may secure bag protector 500 in place and prevent bag protector 500 from slipping, sliding, and/or dislodging from clamp 405, despite protrusion and/or expansion of elastomeric bag 310.

Returning to FIG. 6B, slit 530 may extend from cutout 525 to the axial end of bag protector 500 opposite the corresponding elastomeric bag 310. Slit 530 may be axially aligned with interstice 520 and may be separated from interstice 520 by cutout 525 and ring groove 505, as shown in FIG. 6B. Slit 530 and interstice 520 may together form an axially-extending space, which may allow bag protector 500 to open circumferentially for installation and/or removal of bag protector 500.

During instances of elastomeric bag 310 expansion, for example during operation in high temperatures, the bag protector 500 of illustrative embodiments may separate elastomeric bag 310 from the sharp edges of clamp 405 that may tend to contact protrusions of elastomeric bag 310 as it expands. Protector 500 may thus protect elastomeric bag 310 from being pierced by clamp 405. Bag protector 500 may surround sections of tapered ends 400, which may assist in containing areas of elastomeric bag 310 particularly prone to protrude toward clamp 405. Ring groove 505, with elastomeric ring 510 seated inside, and cutout 525 mated with clamp crimp 410, may ensure that bag protector 500 remains secured around clamp. Channels 515 spaced around the outer diameter of protector 500 may create a fluid pathway between protector 500 outer diameter and seal section housing 305 inner diameter. Illustrative embodiments may prevent and/or reduce failure of seal section 235 despite elevated operating temperatures of about 350-400° F. and/or fatigued expansion of elastomeric bag 310.

Figure 8:
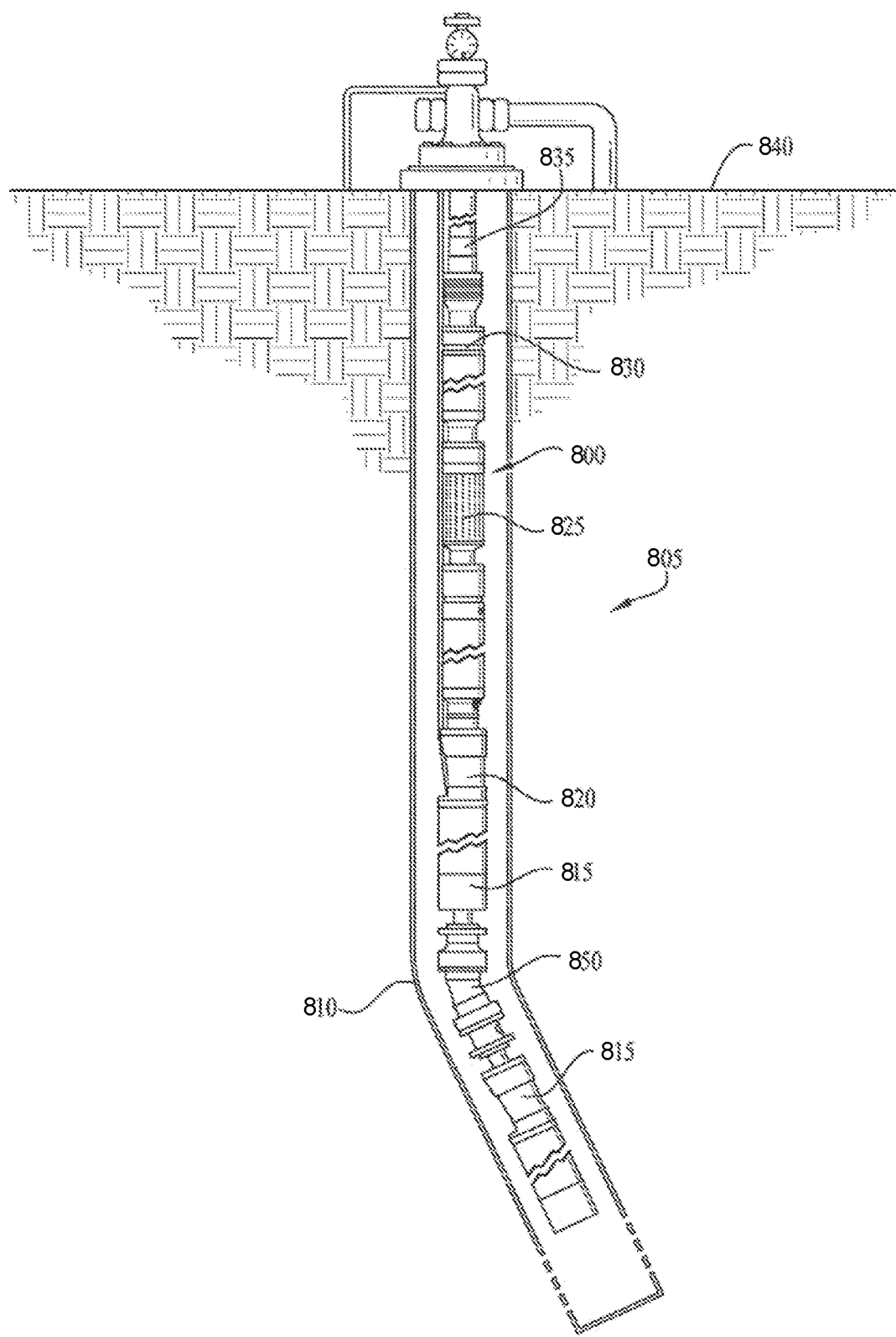
FIG. 8 illustrates an exemplary ESP assembly (ESP equipment string) downhole in a well, according to some embodiments.

FIG. 8 illustrates an exemplary ESP assembly (ESP equipment string) downhole in a well, according to some embodiments. In this example, the well includes a bend of twenty-five degrees per one-hundred feet. As shown in FIG. 8, an ESP assembly 800 has been deployed in a downhole well 805, containing a bend 810. The ESP assembly 800 can include an electric submersible pump, an elastomeric bag to cover the electric submersible pump, clamps, and elastomeric bag protectors (as described herein).

The well 805 may include a bend from vertical towards a horizontal orientation due to subsurface features, composition, location of deposits, and other factors well known in the art. The currently available couplings commonly used in ESP applications typically tolerate a bend of no more than 10 degrees/100 feet, greatly limiting their ability to be used in curved wells. As shown, the ESP assembly 800 includes two tandem motors 815 connected by a flexible joint 850. In FIG. 8, the ESP motors 815 are operating at or near the bend 810, causing the shafts of the two motors 815 to be out of axial alignment with one another. Each motor 815 may be an electric submersible motor between about five and forty feet in length, and may be a two-pole, three-phase squirrel cage induction motor. The bend 810 may be up to and including twenty-five degrees per one-hundred feet. The motor protector (seal section) 820 may protect the motor 815 from the ingress of well fluid, provide separation between well fluid and motor oil, and may provide pressure equalization. The intake 825 may serve as the intake for well fluid into the pump.

The ESP pump 830 may be a multi-stage centrifugal pump that lifts well fluid to a surface 840 of the well 805 or to a collection location through a production tubing 835. The ESP motor(s) 815, a motor protector 820, an intake 825 and an ESP pump 830 all may include shafts extending longitudinally through them. The ESP motor(s) 815 rotate the motor shafts, which in turn rotate the shafts of the motor protector 820, the intake 825 and the ESP pump 830, which are all connected together such as by spline or key. In gassy wells, a charge pump may also be included in the equipment string as a lower tandem pump and/or a gas separator may be included in place of the intake 825 or in conjunction with the intake 825.

Example embodiments include the following:

Embodiment 1

A downhole tool comprising: an electric submersible pump to pump a well fluid to a surface of a borehole; a motor to power the electric submersible pump; and a seal section to protect the motor from the well fluid, the seal section comprising an elastomeric bag, a clamp at each end of the elastomeric bag to secure the elastomeric bag, and an elastomeric bag protector secured around each clamp, wherein the elastomeric bag protector extends axially beyond a respective clamp to surround a tapered portion of the elastomeric bag above and below the clamp, and wherein the elastomeric bag protector has a sloped inner diameter that matches a profile of the tapered portion.

Embodiment 2

The downhole tool of Embodiment 1, wherein an outer diameter of each elastomeric bag protector includes a number of channels.

Embodiment 3

The downhole tool of Embodiments 1 or 2, wherein the number of channels are axially extended relative to the elastomeric bag protector.

Embodiment 4

The downhole tool of any of Embodiments 1-3, further comprising a housing to enclose the seal section.

Embodiment 5

The downhole tool of any of Embodiments 1-4, wherein the number of channels define a plurality of passages for the well fluid to traverse a surface of the elastomeric bag protector between the elastomeric bag protector and the housing.

Embodiment 6

The downhole tool of any of Embodiments 1-5, wherein the elastomeric bag protector includes a cutout and a crimp to mate with the cutout.

Embodiment 7

The downhole tool of any of Embodiments 1-6, wherein the elastomeric bag protector includes a ring groove extending circumferentially around the elastomeric bag protector.

Embodiment 8

The downhole tool of any of Embodiments 1-7, further comprising an elastomeric ring seated inside the ring groove to secure the elastomeric bag protector around the respective clamp.

Embodiment 9

A system comprising: a downhole tool to be lowered into a borehole, the downhole tool comprising an electric submersible pump to pump a well fluid to a surface of the borehole; a motor to power the electric submersible pump; and a seal section to protect the motor from the well fluid. The seal section comprising an elastomeric bag; a clamp at each end of the elastomeric bag to secure the elastomeric bag; and an elastomeric bag protector secured around each clamp, wherein the elastomeric bag protector extends axially beyond a respective clamp to surround a tapered portion of the elastomeric bag above and below the clamp, wherein the elastomeric bag protector has a sloped inner diameter that matches a profile of the tapered portion, and wherein an outer diameter of each elastomeric bag protector includes a number of channels.

Embodiment 10

The system of Embodiment 9, wherein the downhole tool comprises a housing to enclose the seal section.

Embodiment 11

The system of Embodiments 9 or 10, wherein the number of channels define a plurality of passages for the well fluid to traverse a surface of the elastomeric bag protector between the elastomeric bag protector and the housing.

Embodiment 12

The system of any of Embodiments 9-11, wherein the elastomeric bag protector includes a cutout and a crimp to mate with the cutout.

Embodiment 13

The system of any of Embodiments 9-12, wherein the elastomeric bag protector includes a ring groove extending circumferentially around the elastomeric bag protector.

Embodiment 14

The system of any of Embodiments 9-13, wherein the downhole tool comprises an elastomeric ring seated inside the ring groove to secure the elastomeric bag protector around the respective clamp.

Embodiment 15

A method comprising: assembling an electric submersible pump assembly, the assembling comprising, coupling a motor to an electric submersible pump; positioning a seal section between the motor and the electric submersible pump, the seal section including an elastomeric bag; attaching a clamp at each end of the elastomeric bag; and covering each clamp with an elastomeric bag protector such that the elastomeric bag protector extends axially beyond a respective clamp to surround a tapered portion of the elastomeric bag above and below the clamp, and wherein the elastomeric bag protector has a sloped inner diameter that matches a profile of the tapered portion.

Embodiment 16

The method of Embodiment 15, wherein the electric submersible pump assembly is part of a downhole tool, wherein the method comprises: lowering the downhole tool into a borehole; and pumping well fluid using the electric submersible pump to a surface of the borehole.

Embodiment 17

The method of Embodiments 15 or 16, wherein an outer diameter of the elastomeric bag protector includes a number of channels, wherein the downhole tool comprises a housing to enclose the seal section.

Embodiment 18

The method of any of Embodiments 15-17, wherein the number of channels define a plurality of passages for the well fluid to traverse a surface of the elastomeric bag protector between the elastomeric bag protector and the housing.

Embodiment 19

The method of any of Embodiments 15-18, wherein the elastomeric bag protector includes a cutout and a crimp to mate with the cutout.

Embodiment 20

The method of any of Embodiments 15-19, wherein the elastomeric bag protector includes a ring groove extending circumferentially around the elastomeric bag protector, wherein an elastomeric ring seated inside the ring groove to secure the elastomeric bag protector around the respective clamp As used in this specification and the appended claims, the singular forms "a", "an" and "the" include plural referents unless the context clearly dictates otherwise. Thus, for example, reference to an "elastomeric bag protector" includes one or more elastomeric bag protectors. Coupled" refers to either a direct connection or an indirect connection (e.g., at least one intervening connection) between one or more objects or components. The phrase "directly attached" means a direct connection between objects or components.

As used herein, the term "outer," "outside" or "outward" means the radial direction away from the center of the shaft of the ESP and/or the opening of a component through which the shaft would extend.

As used herein, the term "inner", "inside" or "inward" means the radial direction toward the center of the shaft of the ESP and/or the opening of a component through which the shaft would extend.

As used herein the terms "axial", "axially", "longitudinal" and "longitudinally" refer interchangeably to the direction extending along the length of the shaft of an ESP assembly component such as an ESP seal section.

"Downstream" refers to the direction substantially with the principal flow of working fluid when the pump assembly is in operation. By way of example but not limitation, in a vertical downhole ESP assembly, the downstream direction may be towards the surface of the well. The "top" of an element refers to the downstream-most side of the element.

"Upstream" refers to the direction substantially opposite the principal flow of working fluid when the pump assembly is in operation. By way of example but not limitation, in a vertical downhole ESP assembly, the upstream direction may be opposite the surface of the well. The "bottom" of an element refers to the upstream-most side of the element.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A downhole tool comprising:
an electric submersible pump to pump a well fluid to a surface of a borehole;
a motor to power the electric submersible pump; and
a seal section to protect the motor from the well fluid, the seal section comprising,
an elastomeric bag;
a clamp at each end of the elastomeric bag to secure the elastomeric bag; and
an elastomeric bag protector secured around each clamp, wherein the elastomeric bag protector extends axially beyond a respective clamp to surround a tapered portion of the elastomeric bag above and below the clamp, and wherein the elastomeric bag protector has a sloped inner diameter that matches a profile of the tapered portion, and wherein an outer diameter of the elastomeric bag protector includes one or more grooves on the outside surface of the elastomeric bag protector.

2. The downhole tool of claim 1, wherein the one or more grooves are axially extended relative to the elastomeric bag protector.

3. The downhole tool of claim 2, further comprising a housing to enclose the seal section.

4. The downhole tool of claim 3, wherein the one or more grooves define a plurality of passages for the well fluid to traverse a surface of the elastomeric bag protector between the elastomeric bag protector and the housing.

5. The downhole tool of claim 1, wherein the elastomeric bag protector includes a cutout and a crimp on the clamp mates with the cutout.

6. The downhole tool of claim 1, wherein the elastomeric bag protector includes a ring groove extending circumferentially around the elastomeric bag protector.

7. The downhole tool of claim 6, further comprising an elastomeric ring seated inside the ring groove to secure the elastomeric bag protector around the respective clamp.

8. A system comprising:
a downhole tool to be lowered into a borehole, the downhole tool comprising,
an electric submersible pump to pump a well fluid to a surface of the borehole;
a motor to power the electric submersible pump; and
a seal section to protect the motor from the well fluid, the seal section comprising,
an elastomeric bag;
a clamp at each end of the elastomeric bag to secure the elastomeric bag; and
an elastomeric bag protector secured around each clamp, wherein the elastomeric bag protector extends axially beyond a respective clamp to surround a tapered portion of the elastomeric bag above and below the clamp, and wherein the elastomeric bag protector has a sloped inner diameter that matches a profile of the tapered portion, wherein an outer diameter of each elastomeric bag protector includes a number of grooves.

9. The system of claim 8, wherein the downhole tool comprises a housing to enclose the seal section.

10. The system of claim 9, wherein the number of grooves define a plurality of passages for the well fluid to traverse a surface of the elastomeric bag protector between the elastomeric bag protector and the housing.

11. The system of claim 8, wherein the elastomeric bag protector includes a cutout and a crimp on the clamp mates with the cutout.

12. The system of claim 8, wherein the elastomeric bag protector includes a ring groove extending circumferentially around the elastomeric bag protector.

13. The system of claim 12, wherein the downhole tool comprises an elastomeric ring seated inside the ring groove to secure the elastomeric bag protector around the respective clamp.

14. A method for assembling an electric submersible pump assembly, comprising,
coupling a motor to an electric submersible pump;
positioning a seal section between the motor and the electric submersible pump to protect the motor from well fluid, the seal section including an elastomeric bag;
attaching a clamp at each end of the elastomeric bag to secure the elastomeric bag; and
covering each clamp with an elastomeric bag protector such that the elastomeric bag protector extends axially beyond a respective clamp to surround a tapered portion of the elastomeric bag above and below the clamp, wherein the elastomeric bag protector has a sloped inner diameter that matches a profile of the tapered portion and wherein an outer diameter of the elastomeric bag protector includes one or more grooves on the outside surface of the elastomeric bag protector.

15. The method of claim 14, wherein the electric submersible pump assembly is part of a downhole tool, wherein the method comprises:
lowering the downhole tool into a borehole; and
pumping a well fluid using the electric submersible pump to a surface of the borehole.

16. The method of claim 15, wherein the downhole tool comprises a housing to enclose the seal section.

17. The method of claim 16, wherein the number of grooves define a plurality of passages for the well fluid to traverse a surface of the elastomeric bag protector between the elastomeric bag protector and the housing.

18. The method of claim 14, wherein the elastomeric bag protector includes a cutout and a crimp to mate with the cutout.

19. The method of claim 14, wherein the elastomeric bag protector includes a ring groove extending circumferentially around the elastomeric bag protector, wherein an elastomeric ring seated inside the ring groove to secure the elastomeric bag protector around the respective clamp.

* * * * *